EXPANDER-CONTRACTOR AMPLIFIER SYSTEM

Filed April 23, 1946

INVENTORS.
William J. Stolze
& Francis C. Gow
BY C. D. Tuska
ATTORNEY.

Patented May 30, 1950

2,509,705

UNITED STATES PATENT OFFICE 2,509,705

EXPANDER-CONTRACTOR AMPLIFIER SYSTEM

William J. Stolze, Astoria, N. Y., and Francis C. Gow, Chicago, Ill., assignors to Radio Corporation of America, a corporation of Delaware Application April 23, 1946, Serial No. 664,207

4 Claims. (Cl. 179—100.1)

Our invention relates to expander-contractor systems and particularly to amplifier systems utilized in the recording or reproduction of sound.

In accordance with our invention, the gain of an amplifier system is varied as a non-linear function of the amplitude of vibrations, recorded or actual, to be reproduced as sound, or vice versa, by use of a photoelectric device or cell whose photo-sensitive surface is so shaped that the direct current output of the device increases non-linearly as greater and greater area of the surface is illuminated by a beam of light deflected with respect to a reference edge of the surface in accordance with the amplitude of the vibration or sound to be amplified. More specifically, the deflections of the light beam correspond in frequency and amplitude with the vibrations or sound so that the photocell output signal has both an alternating current component corresponding with the frequencies to be amplified and a direct current component, used for gain control purposes, whose magnitude is a non-linear function of the signal amplitude.

Our invention further resides in features of combination and arrangement hereinafter described and claimed.

For a more detailed understanding of our invention and for illustration of systems utilizing it, reference is made to the accompanying drawings, in which:

Fig. 1 diagrammatically illustrates a phonograph system utilizing the invention;

Figure 1:
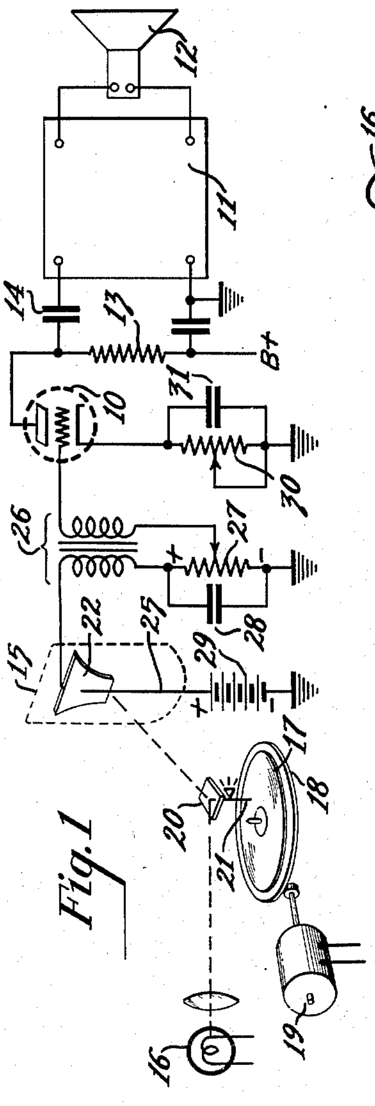

Referring to Fig. 1, the tube 10 is included in the first stage of a phonograph amplifier system whose output impedance, such as load resistance 13, is suitably coupled as by condenser 14 to the next of one or more subsequent stages 11, in the final stage of which is included the loudspeaker 12.

Figure 2:
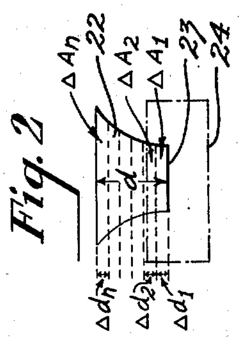
Fig. 2 is an explanatory figure referred to in discussion of the shaping of the photo-sensitive surface of the photocell used in the system of Fig. 1.
Figure 5:
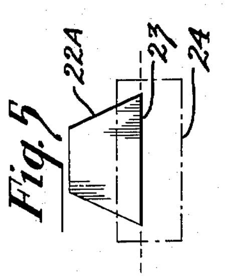
Fig. 5 is an explanatory view referred to in discussion of the photo-sensitive surface of the photocell of Fig. 4.

The input signal applied to the amplifier tube 10 is produced by a photoelectric device 15, upon whose photo-sensitive surface 22 is impressed a beam of light originating at the source 16 and deflected in accordance with the undulations of the sound track or groove on the phonograph record 17. The deflections of the beam may be directly from the sound track itself, or as shown, the beam may be reflected by a mirror 20 mechanically coupled to the phonograph needle 21 for vibration in accordance with the sound track. As shown in Figs. 2 and 5, the area of the light beam is of fixed size and shape, but at any instant overlaps the sensitive surface of the photocell to extent dependent upon the deflection of the beam with respect to the reference edge 23.

The record 17 may be rotated in any conventional manner, for example, it may be disposed upon a turntable 18 driven at constant speed by motor 19.

As the record 17 revolves the light beam is deflected vertically in Fig. 1, with respect to the lower or reference edge of the photosensitive surface 22 in accordance with the frequency and amplitude of the undulations of the sound track on the record. The audio frequency component of the resulting current flowing through the cell 15 is impressed, as by transformer 25, upon the input circuit of the amplifier tube 10.

It is common practice in the recording art to compress the range of vibration of the stylus which cuts the sound track on the record, so that in consequence the amplitude of deflection of the light beam impressed on the photocell 15 does not correspond with the amplitude of the original sound. Various expander arrangements have been devised for causing the reproduced sound to have the same range of amplitude as the original sound but these previous arrangements have involved circuit complications and the use of additional components. Furthermore, at least some of them introduce undesirable effects due to their own characteristics.

Figure 3:
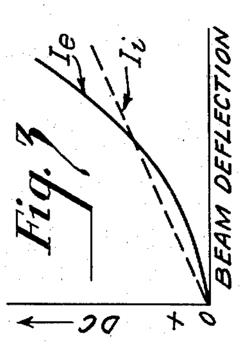
Fig. 3 is an explanatory figure referred to in discussion of the output characteristics of the photocell of Fig. 1.

In accordance with the present invention, the photosensitive surface 22, at least the effective area thereof exposed to the light beam, is so shaped that the direct current component of the cell instead of being linear as in the case of the usual photocell, curve $I_1$, Fig. 3, follows a desired non-linear law, for example, the second power law, or some other exponential function generically illustrated by the curve $I_e$, Fig. 3, and this component is used to control the amplifier gain to attain the desired expansion.

Referring to Fig. 2, the successive increments of area $\Delta A_1, \Delta A_2 \ldots \Delta A_n$ of the photo-sensitive surface become increasingly larger for equal increments $\Delta d_1, \Delta d_2 \ldots \Delta d_n$ of the distance $d$ as measured from the reference edge 23 of the surface. Assuming, for example, that the projected area 24 of the beam occupies the position shown in Fig. 2, when the beam is deflected or vibrated, the direct current component of the cell output increases as a non-linear function of the amplitude of the deflection or vibration, the law of increase being determined by the law of increase of incremental area of the surface for greater and greater displacements of the beam. The sides of the surface may be straight or suitably curved to obtain that law of variation of the direct current component which affords the desired expander action.

This direct current component of cell 15 is utilized to vary the gain in one or more of the amplifier stages as a non-linear function of the amplitude of the alternating current signal to be amplified. Referring to Fig. 1, the direct current component of the output of the cell 15 traverses a resistor 27, suitably bypassed by condenser 28 of low impedance to the alternating current component of the output. All or part of the resulting voltage drop across the resistor 27 is used to produce a grid-biasing potential in opposition to a negative grid-biasing potential supplied by a battery, or as shown, by a cathode resistor 30 which, unless negative feedback is desired, is bypassed by a condenser 31. Therefore, as the deflections of the beam become larger and larger, the biasing potential applied to the grid of tube 10, or another tube or tubes of the amplifier system, becomes less and less negative in accordance with the law fixed by the shaping of the photo-sensitive area of the cell 15 and thus the gain of the amplifier follows a similar law to provide the desired expansion of the aduio-frequency component of the signal, so as to attain the desired correspondence between the range of amplitude of the reproduced signals and the range of amplitude of the original from which the recording is made.

It shall, of course, be understood that the photoelectric device may be any of the known types such as a high vacuum photoelectric tube, a gaseous photoelectric tube, or one of the solid type such as the copper-copper-oxide type, the selenium-iron type, and the like.

In amplifier systems used in the cutting of phonograph records or in advance of the modulators of a radio transmitter, it is desirable to effect compression to avoid cross-over in cutting of the records or over-modulation in the case of radio transmitters.

Figure 6:
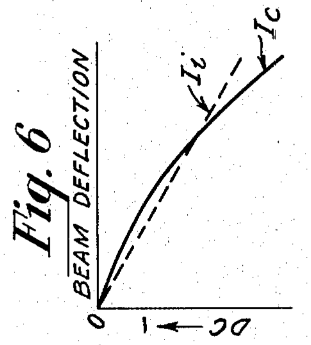
Fig. 6 is an explanatory view referred to in discussion of the characteristics of the photocell of Fig. 4.

Such compression may be effected by suitably shaping the area of the photo-sensitive surface of photocell 15A; as shown in Fig. 5, the successive increments of area of surface 22A become less and less with greater and greater deflections of the beam 24 from the reference edge 23, so that the direct current component of the output of the cell follows the law generically exemplified by curve $I_c$ of Fig. 6. By utilizing this direct current component to control the bias of one or more amplifier stages for higher and higher amplitudes of the alternating current component of the signal, the desired compression may be attained.

Figure 4:
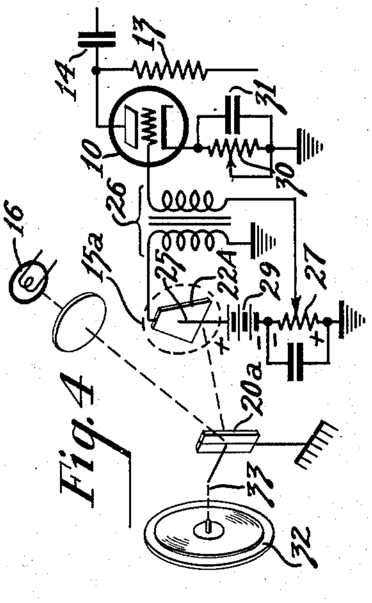
Fig. 4 is a fragmentary diagrammatic view of a system used in conversion of sound energy to electrical energy to be amplified.

As shown in Fig. 4, the deflection of the beam may, in response to the sound energy to be converted into an electrical signal by the photocell 15A, be effected by a mirror 20A suitably connected as by a link 33 to a microphone diaphragm 32, or other pick-up device. The direct current output of the photocell traverses a resistor 27 to provide a voltage, all or a part of which is used for compression purposes. Specifically, this voltage may be utilized negatively to bias the control grid of one or more stages of the amplifier, the negative bias increasing more and more rapidly with increase in the signal amplitude to decrease the amplifier gain as a non-linear function thereof.

In this modification, the resistor 27 provides a negative bias even at zero signal input. Consequently, that bias may alone be utilized and a separate biasing battery or cathode resistor may not be necessary in the stage or stages whose gain is controlled by resistor 27.

Figure 7:
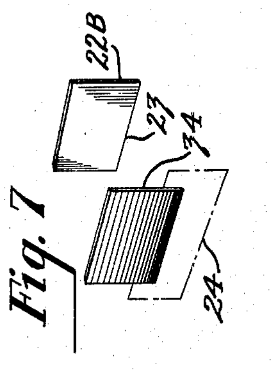
Fig. 7 is an explanatory view referred to in discussion of the modification of the photocells of Figs. 1 and 4.

As an alternative to shaping of the photo-sensitive surface of the photoelectric device in order to attain the desired law of variation of the direct current component, there may be utilized a photo-sensitive surface 22B, Fig. 7, of simple rectangular configuration in front of which, however, there is disposed a mask or screen 34 of density varying with the distance from its lower or reference edge to afford the desired variation of incremental change in area of surface 22B with increasing deflections of the beam 24.

Figure 8:
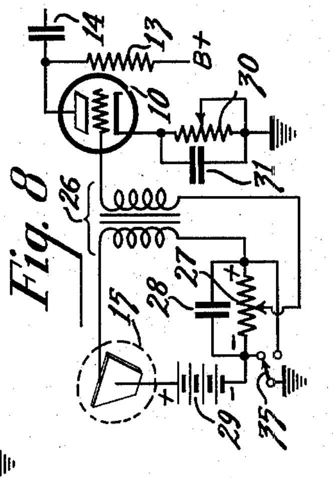
Fig. 8 is a fragmentary view of a system providing for either expansion or compression.

As shown in Fig. 8, the same amplifier system and photoelectric cell may be used either for compression or expansion by provision of a switch 35 which, when thrown to one position, derives from resistance 27 a negative biasing potential for compression purposes and which, when thrown to its other position, provides a positive biasing potential which increases with increasing amplitude of signal for expansion purposes. Concurrently with such change in position of the switch 35, it is, of course, necessary to change the fixed negative bias potential, such as provided by the cathode resistor 30, in order to establish the desired grid potential of the controlled stage or stages of the amplifier at zero signal input.

In the illustrated modifications of our invention, the photoelectric cell is used both to convert the deflections of the beam into an alternating current input for the amplifier and to provide a gain control voltage. It may be used for the latter purpose alone and the alternating current input signal derived from another conventionally shaped photo-sensitive surface of the same tube or of a different tube. It is, of course, more convenient to use a single tube or photo-sensitive surface for the dual purpose as illustrated in Figs. 1, 4 and 8.

It will be understood, however, that our invention is not limited to the particular arrangements shown and that it is subject to changes and modifications, all within the scope of the appended claims.

What is claimed is:

1. A signal reproducing system comprising an alternating current amplifier including one or more electronic tubes whose bias determines the amplifier gain, a photocell having an electrode whose successive increments of exposed light-sensitive area progressively vary for equal increments of distance from a reference edge thereof, means for producing a light beam of area more than sufficient to illuminate the summation of said incremental exposed light-sensitive areas of the photocell electrode, means for vibrating said light beam in direction normal to said reference edge of the photocell electrode in accordance with frequency and amplitude of signals to be amplified whereby the photocell output has an alternating component corresponding with the signal frequency and a unidirectional component differing from the signal amplitude to extent determined by the inequality of said successive exposed incremental electrode areas, coupling means for impressing said alternating component of the photocell output upon said amplifier for reproduction of the signal frequencies, and a tube biasing network traversed by said unidirectional component of the photocell output for varying the amplifier gain as a non-linear function of the signal amplitude.

2. The combination as defined in claim 1 in which the width of the light-sensitive electrode progressively increases with distance from the reference edge thereof for increasing the amplifier gain with increasing amplitude of vibration of said light beam.

3. The combination as defined in claim 1 in which the width of the light-sensitive electrode progressively decreases with distance from the reference edge thereof whereby the amplifier gain is decreased for increasing amplitude of vibration of said light beam.

4. The combination as defined in claim 1 in which progressive variation in exposed area of successive increments of the photocell electrode is effected by a screen of graded density and opposed between said photocell and said beam-producing means.

WILLIAM J. STOLZE.
FRANCIS C. GOW.

REFERENCES CITED

The following references are of record in the file of this patent:

UNITED STATES PATENTS

| Number | Name | Date |
|---|---|---|
| Re. 21,293 | Hanna | Dec. 12, 1939 |
| 1,690,224 | Gent | Nov. 6, 1928 |
| 1,691,147 | Clark | Nov. 13, 1928 |
| 1,937,754 | Gieskieng | Dec. 5, 1933 |
| 2,082,627 | Haugh | June 1, 1937 |
| 2,084,119 | Albersheim | June 15, 1937 |
| 2,136,873 | Balsley | Nov. 15, 1938 |
| 2,171,531 | Balsley | Sept. 5, 1939 |
| 2,257,795 | Gray | Oct. 7, 1941 |
| 2,316,113 | Thompson | Apr. 6, 1943 |
| 2,363,361 | Reiskind | Nov. 21, 1944 |
| 2,410,550 | Padra | Nov. 5, 1946 |
| 2,444,442 | Herbold | July 6, 1948 |
| 2,473,893 | Lyle | June 21, 1949 |